US012582117B2

(12) United States Patent
Yingling et al.

(10) Patent No.: US 12,582,117 B2
(45) Date of Patent: Mar. 24, 2026

(54) ENCAPSULATION OF LARVICIDES INTO BIOPOLYMER CAPSULES

(71) Applicants: UNM RAINFOREST INNOVATIONS, Albuquerque, NM (US); Fundacao Oswaldo Cruz, Rio de Janeiro (BR)

(72) Inventors: Alexandra Victoria Yingling, Albuquerque, NM (US); Ivy Foo-Hurwitz, Albuquerque, NM (US); Linnea Ista, Albuquerque, NM (US); Scott Matthews, Williamsville, NY (US); Fernando Genta, Rio de Janeiro (BR); Bruno Gomes da Silva, Rio de Janeiro (BR)

(73) Assignees: UNM RAINFOREST INNOVATIONS, Albuquerque, NM (US); Fundacao Oswaldo Cruz, Rio de Janeiro (BR)

( * ) Notice: Subject to any disclaimer, the term of this patent is extended or adjusted under 35 U.S.C. 154(b) by 966 days.

(21) Appl. No.: 17/469,135

(22) Filed: Sep. 8, 2021

(65) Prior Publication Data

US 2024/0041029 A1 Feb. 8, 2024

Related U.S. Application Data

(60) Provisional application No. 63/076,041, filed on Sep. 9, 2020.

(51) Int. Cl.
| | |
|---|---|
| *A01N 63/23* | (2020.01) |
| *A01N 25/10* | (2006.01) |
| *A01N 65/10* | (2009.01) |
| *A01N 65/22* | (2009.01) |
| *A01N 65/24* | (2009.01) |
| *A01N 65/26* | (2009.01) |
| *A01N 65/36* | (2009.01) |

(52) U.S. Cl.
CPC ............. *A01N 25/10* (2013.01); *A01N 63/23* (2020.01); *A01N 65/10* (2013.01); *A01N 65/22* (2013.01); *A01N 65/24* (2013.01); *A01N 65/26* (2013.01); *A01N 65/36* (2013.01)

(58) Field of Classification Search
CPC ........ A01N 25/10; A01N 63/23; A01N 65/10; A01N 65/36
See application file for complete search history.

(56) References Cited

U.S. PATENT DOCUMENTS 11,337,422 B2    5/2022  Foo-Hurwitz et al.
2024/0081341 A1*  3/2024  Yingling ................. A01N 25/26

FOREIGN PATENT DOCUMENTS

| CN | 107840981 A | * | 3/2018 | ........... B65D 65/463 |
|---|---|---|---|---|
| CN | 108576065 A | | 9/2018 | |
| WO | WO2006-100308 A2 | | 9/2006 | |
| WO | WO-2016168837 A1 | * | 10/2016 | ............ A01N 25/28 |
| WO | PCT/US2023/035685 | | 10/2023 | |

OTHER PUBLICATIONS

Lopes et al. (Preparation methods and applications behind alginate-based particles, Expert Opinion on drug delivery, 2017, vol. 14, No. 6, pp. 769-782) (Year: 2017).*

Pant, Megha et al., Encapsulation of neem and karanja oil mixture for synergistic as well as larvicidal activity for mosquito control., Journal of Scientific & Industrial Research, vol. 71, May 2012, pp. 348-352, Institute of Pesticide Formulation Technology, India.

Maes, C. et. al. Encapsulation of essential oils for the development of biosourced pesticides with controlled release: A review, Molecules, 2019, vol. 24, pp. 1-15, abstract; pp. 1-2, 7.

Workman, M.J. et al. Yeast-encapsulated essential oils: a new perspective as an environmentally friendly larvicide. Parasites a & vectors, 2020, vol. 13, pp. 1-9, abstract; p. 2, right column; p. 3, right column; p. 7 left column.

Soliman, E.A. et al., Microencapsulation of Essential Oils within Alginate: Formulation and in Vitro Evaluation of Antifungal Activity, Journal of Encapsulation and Adsorption Sciences, 2013, vol. 3, p. 48-55.

Abreu, Flavia O.M.S., Chitosan/cashew gum nanogels for essential oil encapsulation, Carbohydrate Polymers 89 (2012), 1277-1282, Elsevier Ltd., Brazil.

Gomes, Bruno et al., High larvicidal efficacy of yeast-encapsulated orange oil against Aedes aegypti strains from Brazil, Parasites & Vectors (2021) 14:272, BMC, Brazil.

Soto, Ernesto et al, Yeast Cell Wall Particle Encapsulation of Pro-Terpene Payloads, TechConnect Briefs 2019, University of Massachusetts Medical School, Worchester, MA.

Fernandez-Perez, Manuel, Controlled release systems to prevent the agro-environmental pollution derived from pesticide use, Journal of Environmental Science and Health, 42:7, 857-862, Taylor & Francis, Almirea, Spain.

Paula, Haroldo C.B. et al, Preparation and characterization of chitosan/cashew gum beads loaded with Lippis sidoides essential oil, Materials Science and Engineering C, 31 (2011) 173-178, Elsevier Ltd., Brazil.

Ozbilenler, Cahit et al., Syntheses of quercetin-encapsulated alginate beads with their antioxidant and release kinetic studies, Journal of Macromolecular Science, Pure and Applied Chemistry, Part A, 58:1, 22-31, Taylor & Francis, Turkey.

* cited by examiner

*Primary Examiner* — Bethany P Barham
*Assistant Examiner* — Danielle Johnson
(74) *Attorney, Agent, or Firm* — Cosud Intellectual Property; Henry D. Coleman

(57) ABSTRACT

The present invention describes capsule compositions consisting of crosslinked chitosan, beta-glucan or alginate, and encapsulates an environmentally compatible ingestible larvicide, especially larvicidal agents such as essential oils or other ingestible larvicides such as *Bacillus thuringiensis* which are lethal to the larvae of pest insects, especially mosquito larvae.

20 Claims, 5 Drawing Sheets

ENCAPSULATION OF LARVICIDES INTO BIOPOLYMER CAPSULES

FIELD OF THE INVENTION

This invention is directed to novel compositions which comprise of a biopolymer capsule of chitosan, beta-glucan, and/or alginic acid (alginate), each of which is crosslinked, and encapsulates an environmentally compatible ingestible larvicide comprised of larvicidal agents such as essential oils or *Bacillus thuringiensis* (Bti), which are especially lethal to mosquito larvae.

RELATED APPLICATIONS

This application claims the benefit of priority of U.S. provisional application Ser. No. 63/076,041, filed Sep. 9, 2020, the entire contents of which are incorporated by reference herein.

BACKGROUND AND OVERVIEW OF THE INVENTION

Significant resources are devoted to limiting and/or controlling various "pest" insect populations that are known to be pathogen carriers of human and/or non-human disease and/or are linked to the destruction of crops and/or other undesired outcomes. For example, mosquitos are known vectors of diseases including, but not limited to, malaria (*Anopheles*) Zika virus, dengue virus, yellow fever (*Aedes*), and West Nile virus (*Culex*). Accordingly, it is highly desirable to manage the population of pest insects at the larval stage before the insects are able transmit diseases or decimate crops.

The need for vector control measures is particularly common in rural and resource-poor communities. As such, successful vector control methods are simple, low cost solutions that are easy to deploy.

The most commonly used method for limiting and/or controlling undesirable insect populations are pesticides, which can be harmful to humans and/or non-target species. In an attempt to control mosquito populations, many communities resort to adding synthetic pesticides to water reservoirs, including sources of potable water. This poses a health risk to these communities, as synthetic pesticides include neurotoxins and growth inhibitors. Furthermore, the manufacturing processes, storage, and transport of these synthetic pesticides present potential health hazards to humans and/or other non-target species.

Other methods for controlling insect populations, such as the engineering of genetically modified insects, are expensive and limited in application for a specific variety of mosquito (*Aedes*). Furthermore, genetic modification may not be the most effective method for vector control as it may not possible to control the movement or migration of an insect population. Finally, as this technology is new and largely untested, it is difficult to predict the long-term consequences and efficacy of releasing genetically modified populations of mosquitos.

Recently, methods of controlling pest insect populations that are non-toxic to humans, animals, and/or desirable insect populations, but toxic to undesirable insect populations have been introduced. One such method utilizes essential oils, which are non-toxic (to humans and other animals) but are effective in killing insect larvae. However, the use of essential oils to control or limit pest population is difficult as rather large amounts of essential oil have to be added repeatedly to oviposition sites to achieve significant reduction in the pest population. Moreover, the dispersed oils are vulnerable to degradation by UV radiation and other environmental factors and otherwise disrupt the aquatic environment. Accordingly, an effective mechanism for delivering essential oils directly to the pest larvae population is greatly desired.

Recently, yeast-encapsulated larvicide has been introduced and represents a novel and effective approach for controlling mosquito larvae populations. In its current formulation, the yeast-encapsulated larvicide is optimized for application into areas with standing water (cisterns, ponds, etc.). However, *Aedes* mosquitoes breed in small containers in areas around the home. Further, *Aedes* eggs can withstand desiccation, hatching only when the rains come.

In this application, the inventors report the development of an innovative approach to package their previously patented (U.S. Pat. No. 10,555,519 entitled "Novel Non-Toxic Larvicide") larvicide, which is incorporated by reference in its entirety herein. In repeated laboratory testing, the patented larvicide kills *Aedes* and *Culex* larvae rapidly with an LD 90 of less than 30 ppm in 24 hours (Workman et al, *Parasit Vectors,* 2020).

The present invention is designed for site pre-treatment using polymeric capsules based upon chitosan, beta-glucan and/or alginic acid (alginate). The formulations of the present invention will protect the larvicide upon application to dry treatment sites. Upon hydration (e.g. rain, dew, etc.), the larvicide will be rapidly released. Ingestion of the larvicide by hatching larvae (i.e. from mosquito eggs left in the area during previous rain fall, or freshly laid eggs) will result in death, thereby providing the site with larval source management.

BRIEF DESCRIPTION OF THE INVENTION

The present invention describes an environmentally compatible capsule, comprising chitosan, beta-glucan, alginic acid (alginates) or mixtures thereof, which encapsulates ingestible environmentally compatible larvicides. Specifically, the larvicides include yeast encapsulated essential oils, other essential oils and other ingestible larvicides, such as Bti. Larvicide which are released from the capsules upon hydration. When ingested, these larvicides are lethal to the targeted species of insect larva.

In an embodiment, compositions according to the present invention comprise microparticles which are prepared by spray drying and/or encapsulating larvicide, preferably yeast-encapsulated larvicide, with chitosan and/or beta-glucan as described herein. In embodiments, the larvicidal agent, specifically essential oils or other ingestible larvicides, may be directly (i.e., without first being encapsulated with yeast) spray dried (to preferably provide microcapsules of chitosan and/or beta-glucan) or alternatively, the larvicide is first encapsulated in yeast (*S. cerevisiae* as fresh or dried baker's yeast) before being further encapsulated. In embodiments, the microparticles or the yeast-encapsulated larvicide are then further crosslinked with chitosan, beta-glucan and/or alginic acid in a crosslinker solution resulting in the final capsules. These final capsules are then used directly or alternatively, can be further formulated into tablets for distribution into the environment. Thus, in embodiments, the present invention is directed to microparticles comprising larvicide or yeast-encapsulated larvicide particles, which are further encapsulated with ingestible crosslinked biopolymer comprising crosslinked chitosan, beta-glucan and/or alginic acid. These capsules may be used directly or formulated into tablets or other delivery forms. Pursuant to the present invention, the release of larvicide from the capsules may be modified to provide a quick/immediate release or a delayed and/or sustained release in order to exhibit maximum effect on larval populations, depending upon the larva to be impacted and the environmental conditions under which the larvicide is released from the capsules and/or the microparticles.

In embodiments, the compositions comprise 0.1% to 25% by weight larvicide, more often 0.5% to about 15% larvicide, even more often about 1% to about 10% by larvicide, the remaining portion of the capsule comprising crosslinked polymer. In embodiments, yeast-encapsulated larvicide or the microparticles described above are further encapsulated with crosslinked chitosan, beta-glucan and/or alginic acid. Yeast encapsulated larvicide, when used, comprises about 1% to about 95%, often 10% to 85%, or 25% to 75% by weight of the encapsulated larvicide and crosslinked polymer taken together (i.e., the final weight of the capsules). Larvicide microparticles, when used, comprise 1% to 99%, often 5% to 85%, 10% to 80%, 25% to 75% or 30% to 65% by weight of the larvicide microparticles and crosslinked polymer taken together. The capsules comprise 1% to 99%, often 5% to 99%, 15% to 95%, 25% to 95% or 35% to 75% by weight crosslinked polymer selected from the group consisting of chitosan, beta-glucan and/or alginic acid, each of which is crosslinked with from about 0.05% to about 10% by weight crosslinker, often about 0.1% to about 7.5% by weight crosslinker, about to about 2.5% by weight crosslinker (based upon the weight of crosslinker and polymer within the capsule).

In embodiments of the present invention, chitosan and beta-glucan are crosslinked with about 0.05 to 10.0%, often 0.1% to 5%, more often about 0.5% to about 2.5% by weight glutaraldehyde, gelatin or genipine. In embodiments, chitosan also may be crosslinked with about 0.05% to about 7.5% by weight, often about 0.1% to about 5%, even more often about to 2.5% by weight tripolyphosphate as crosslinker. In embodiments, alginic acid is crosslinked with a divalent cation such as $Ba^{2+}$, $Mg^{2+}$, $Ca^{2+}$, $Sr^{2+}$, in an amount ranging from about 0.01% to about 2.5%, often about 0.05% to about 1% by weight of divalent cation to polymer.

In embodiments, the ingestible larvicide is an essential oil. In embodiments, the larvicide is Bti (*Bacillus thuringiensis* subspecies *israelensis*), which is a naturally occurring bacterium found in soil which produces toxins to insect larva, especially mosquito, blackfly and fungus gnat larva. In embodiments the larvicide is a mixture of an essential oil and Bti. In embodiments, the essential oil is orange oil (which term includes sweet orange oil), fennel oil, thyme oil, basil oil, peppermint oil, clove bud oil, neem oil or a mixture thereof.

In an embodiment, the present invention is directed to a method for eradicating a targeted insect larvae population. This method comprises exposing a target population of insect larva to an effective amount of a composition according to the present invention. In preferred embodiments, the present invention targets different species of *Aedes, Culex* and *Anopheles* mosquitos.

BRIEF DESCRIPTION OF THE FIGURES

FIG. 1 shows the chemical structure of chitosan repeat units in chitosan polymers used in embodiments according to the present invention. Shown is the chitosan repeat unit (n=50-2500, often 1.000-1500) and the end unit chemical structures.

FIG. 2 shows the Beta-1,3-glucan repeat and end unit chemical structure. n is typically 50-2500, often 1000-1500.

FIG. 3 shows the alginate chemical structure comprising repeat units of L-Guluronic acid (m=50-1500, more often 500-1000, left) and D-Mannuronic acid (n=50-1500, more often 500-1000, right).

DETAILED DESCRIPTION OF THE INVENTION

Figure 4:
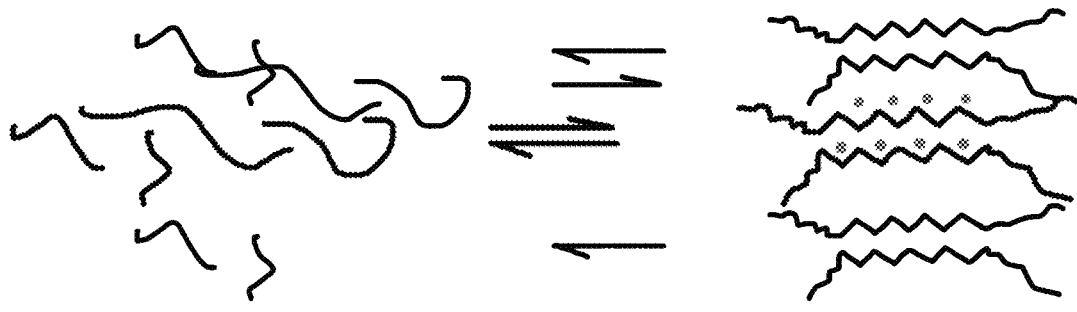
FIG. 4 shows an egg-box structure as a result of polymer crosslinking.

The present disclosure provides a novel capsule based upon crosslinked polymers selected from chitosan, beta-glucans, alginic acid and mixtures thereof that are ingestible by and toxic to targeted species and non-toxic to humans and non-target species. This formulation, which is cost-effective to manufacture, provides targeted larvicide release that allows for maximum impact of larvicide on targeted insect larvae and provides for significantly flexibility in the concentration and timing of the release of larvicide. The present disclosure also provides methods for making and using the novel capsule.

For the purposes of the present disclosure, the target larvae or target species refers to the intended target of the larvicide. While many of the specific embodiments provided herein refer to mosquito larvae as the intended target, it will be understood that larvae of other insects or other species may also be the intended target and that the larvicide may be altered, as described herein, to be more particularly suited towards one target or another, including black flies and fungus gnats, among others. Furthermore, it will be understood that the novel larvicide described herein may be designed to be suitable for more than one target and that references to "a" or "the" target species does not necessarily preclude embodiments wherein there is more than one target species. In embodiments, the targeted larvae is mosquito (various species of *Aedes, Culex* and *Anopheles*), black fly or fungus gnat larvae.

According to various embodiments, the novel capsule comprises a larvicide encapsulated into a polymer matrix consisting of crosslinked chitosan, beta-glucan, alginic acid and mixtures thereof. According to various embodiments, the larvicide is a substance that is non-toxic to humans and other non-target species, but which negatively impacts the ability of the target species to behave in an undesirable manner. According to a specific embodiment, the larvicidal agent is often an essential oil or a bacterium toxic to specific larvae such as Bti.

Essential oils include terpene components and other active components (primary compounds) and are naturally produced by plants to provide protection from larvae and adult insects, while being non-toxic to humans. For the purposes of the present disclosure, essential oils are defined as terpene containing oils produced by plants. For more than three decades, essential oils have been recognized as cheap, effective larvicides. Essential oils are thought to exert larvicidal effects through three different mechanisms: neurotoxicity, growth inhibition, and interruption of metabolic pathways. The simultaneous action of these mechanisms retards the evolution of resistance to the larvicide. Examples of essential oils that are suitable for use as larvicide include, but are not necessarily limited to orange oil, fennel oil, thyme oil, basil oil, peppermint oil, clove bud oil, neem oil or a mixture thereof. Since the composition of essential oils varies, oils may be combined to enhance larvicidal efficacy where the environment or larval physiology provide opportunity. Suitable essential oils can be purchased commercially at low cost or extracted from the plants from which they are derived using standard techniques. In embodiments, fennel oil has been found to be particularly effective as a larvicide. Accordingly, in a more specific embodiment, the larvicidal element is or includes orange oil and/or fennel oil.

For the purposes of the present disclosure the term "capsule" is intended to mean a crosslinked polymeric capsule capable of encapsulating the larvicide and generally sequestering it from the environment until the delivery vehicle is exposed to environmental elements which facilitate its release or ingested by the target species. The capsule is generally non-toxic to non-target species. The delivery vehicle should have sufficient durability in the environment in which it will encounter the target species that it can withstand the conditions long enough for the released larvicide to be ingested by the target species. According to some embodiments the capsule may be inert to all or most environments that do not replicate the environmental conditions found in the digestive system of the target species.

Accordingly, in embodiments, the capsule may incorporate an inactive or non-viable yeast cell which encapsulates the larvicidal agent. According to a more specific embodiment, the capsule utilizes a non-viable yeast cell of the *S. cerevisiae* variety to encapsulate the larvicide prior to further encapsulation with crosslinked polymer. It is a well-documented feature of larval biology that mosquito larvae will readily digest *S. cerevisiae*. In fact, a recommended food for rearing larvae in laboratory settings is *S. cerevisiae*. Moreover, the cell membrane of yeast cells is rich in beta-glucan, a polysaccharide, and chitin. Larvae have intestinal enzymes specialized for the digestion of beta-glucan to rapidly break down ingested yeast cell membranes.

In some embodiments, larvicide is spray-dried with beta-glucan or chitin to first provide microparticles which may be further encapsulated. In still other embodiments, the larvicide is directly encapsulated with crosslinked polymer as otherwise described herein.

In preferred embodiments, larvicidal agents may be encapsulated, infused, injected, entrapped, loaded, etc. (referred to herein collectively as "encapsulated" for ease of discussion) into yeast cells using any suitable method depending on the specific larvicidal element and encapsulating polymer used to form capsules pursuant to the present invention. Examples of suitable methods for encapsulating the larvicidal element into yeast cells include, but are not limited to, a combination of heat and agitation, plasmolyzation, and coacervation as described in greater detail in the Examples section herein below.

According to a specific embodiment wherein a larvicidal capsule comprises an essential oil such as orange or fennel oil, among others, as the larvicide and a yeast cell such as an *S. cerevisiae* cell, as an ingestible delivery vehicle to be further encapsulated with a crosslinked polymer as described herein. The heat and agitation method results in the encapsulation of all components of the essential oils without discrimination, including terpenes and aldehydes. However, molecules as large as 400 kDa can freely diffuse through the cell wall.

Once the essential oil enters the yeast cell, the yeast becomes nonviable and cannot replicate, thereby reducing or eliminating any potential impact on the environment during storage, transportation, and/or use. However, while the yeast cell is nonviable, the cell's thick outer membrane remains intact and thus sequesters the oil from the surrounding environment. As explained above, some target species, such as mosquito larvae have intestinal enzymes that are specialized for the digestion of beta-glucan, thus resulting in a system wherein the essential oil/yeast cell capsule is essentially inert to all environments it is likely to encounter other than the specialized digestive systems of the target mosquito larvae.

According to a specific embodiment of use, the capsules of the present disclosure could be distributed directly to dry mosquito or other insect breeding sites prior to rainfall. Upon hydration, the capsules will swell, releasing the microcapsules (containing larvicide) that will be ingested by hatching mosquito larvae. Thus, the present microcapsules release larvicide during environmental conditions which serve to enhance larval population and growth.

This formulation could be used in conjunction with existing municipal or rural larvicide/insecticide/other pest control programs. Furthermore, because the presently described system can be used in environments where traditional chemical larvicides and insecticides aren't used due to safety risks, the presently described larvicidal system can be used in high-value breeding sites, specifically in urban areas.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The "effective" is used to describe an amount of a polymer, larvicide or other component used to provide encapsulated larvicide according to the present invention which is provided and used to effect an intended result within the context of the use of the component. The term effective is also used to describe an amount of encapsulated larvicide which is used to control insect larvae and other pests as otherwise described herein.

The term "larvicide" includes essential oils and Bti and other ingestible materials which are toxic to a targeted organism, especially insect larvae, but which are principally non-toxic to humans and other non-targeted organisms. Essential oils which are useful in the present invention include orange oil, fennel oil, thyme oil, basil oil, peppermint oil, clove bud oil, neem oil or a mixture thereof. In embodiments of the present invention, the essential oil is orange oil or fennel oil. In embodiments, the larvicide is encapsulated in a yeast (*S. cerevisiae*) cell as otherwise described herein.

The term "polymer" includes chitosan, beta-glucan, alginic acid and mixtures thereof as otherwise described in the present invention. Medium to high molecular weights of the alginate (1 to 1000 kDa, often 100-400 kDa as described herein) and chitosan (1 to 1000 kDa, often, 200-400 kDa as described herein) will be used in order to improve the protective and mechanical properties of the bead. Low molecular weight alginate (<100 kDa) or chitosan (<200 kDa) may be respectively incorporated into the capsules during processing in order to reduce the shear forces during manufacturing while still maintaining key properties. Alginate should be 10-30% methacrylated and chitosan should be ≥75% deacetylated in order to achieve optimum crosslinking of either polymer.

Figure 1:
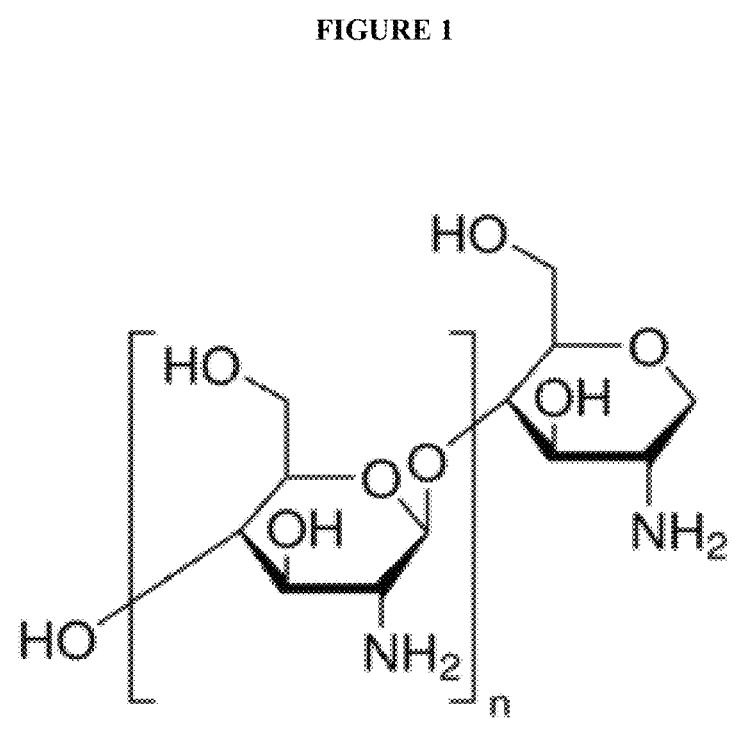

The term "chitosan" is used to describe a deacetylated derivative of chitin, which is a polysaccharide typically found in the exoskeletons of shrimp and crabs, among other crustaceans. The chemical structure of chitosan can be observed in FIG. 1, below. Chitosan has been shown to have antibacterial properties. The antibacterial properties of chitosan make it ideal for this formulation as it would protect the payload from bacteria interference when submerged in water. Further, mosquito larvae have been shown to readily ingest chitosan, so it should not act as a deterrent for the larvae. Medium to high molecular weights of chitosan are used in the present invention, often ranging from about 1 to 1000 kDA, often 25 to 1000 kDA, to 1000 KDa, often 75-500 kDA, more often about 100 to 400 kDa. Small molecular weight chitosan may be added to formulations to enhance shear forces during manufacturing while maintaining the integrity of the final product produced. Chitosan should be ≥75% deacetylated in order to achieve optimum crosslinking of polymer.

The chemical structure of chitosan is presented in FIG. 1.

Figure 2:
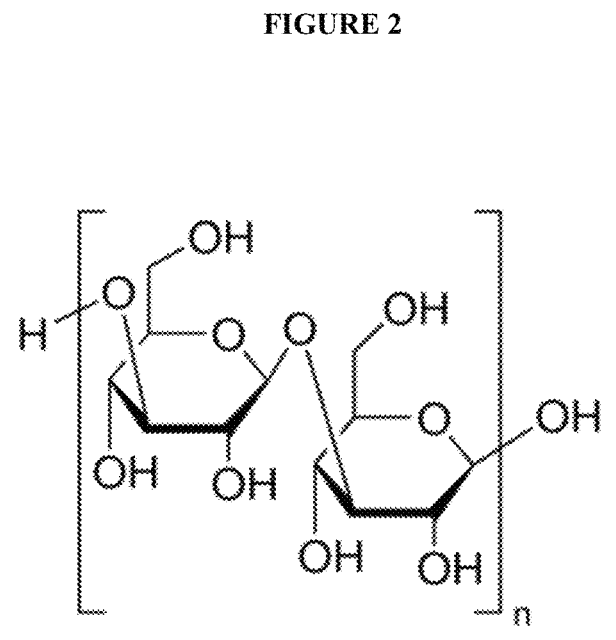

The term "beta-glucan" is used to describe a naturally occurring polysaccharide commonly found in the cell wall of *S. cerevisiae* (baker's yeast). This polysaccharide is what allows larvae to break down yeast in the gut. For this reason, the incorporation of beta-glucans is used to control digestion rates of the capsules in the larvae gut to target the most susceptible part of the gut. The formula for beta-glucans is shown in FIG. 2, below. The molecular weight of the beta-glucans ranges often ranges from about 50 to 1000 KDA, often 75-500 kDA, more often about 100 to 400 kDa.

FIG. 2 shows the Beta-1,3-glucan repeat and end unit chemical structure. n is typically 50-2500, often 1000-1500.

Figure 3:
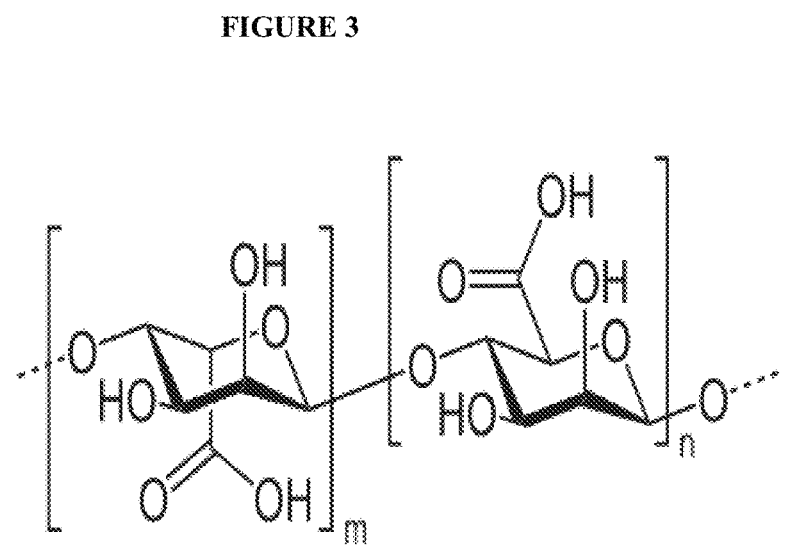

The term "alginate" or "alginic acid" is used to describe a UV-protective biopolymer found in the cell wall of Phacophycae (brown algae) that becomes a hydrogel in the presence of water. Alginate is widely used across agricultural, biomedical, and food industries due to simple protocols and ease of structural manipulation to control rates of release and degradation. FIG. 3 below shows the chemical structure of alginate. The ratios of L-guluronic acid and D-mannuronic acid blocks in alginate vary. In embodiments, the alginate is often methacrylated, more often at a level of 5% to 40%, more often at about 10% to about 30%.

FIG. 3 shows the alginate chemical structure comprising repeat units of L-Guluronic acid (m=50-1500, more often 500-1000, left) and D-Mannuronic acid (n=50-1500, more often 500-1000, right).

The term "crosslinking" is used to describe the bonding of long polymeric chains to each other through crosslinking agents at varying weight ratios to provide capsules according to the present invention. The types of crosslinking used in the formation of capsules pursuant to the present invention include chemical (covalent) crosslinking and physical (ionic) crosslinking. Chemical crosslinking utilizes covalent bonding to crosslink the polymers. This method allows different polymer chains to be crosslinked with each other. This method is used for the crosslinking of chitosan to the beta-glucans present in the yeast cell wall of the yeast-encapsulated essential oils. This process requires a chemical reagent that has reactive groups that can stimulate specific chemical groups in the polymers to link with each other. Traditional chemical crosslinking uses glutaraldehyde as a crosslinker. However, due to concerns with toxicity, gelatin and/or genipine are often used. For chitosan crosslinking, polytriphosphate may also be used. The crosslinking agent is typically removed after the crosslinking occurs.

Physical crosslinking is the crosslinking of a polymer via ionic bonds. Opposite charges between the polymer and crosslinker are necessary for the ionic bonds to form. For alginate, the ionotropic gelation technique is used and consists of exposing the alginate-larvicide solution to a divalent cation solution, for example using $Ba^{2+}$, $Sr^{2+}$, $Ca^{2+}$, or $Mg^{2+}$ cations. This crosslinking will transform the alginate-larvicide mixture into capsules that are then washed to remove residual crosslinkers to halt further crosslinking.

Crosslinker concentration and crosslinking time will vary depending on the polymer used to form the capsule, whether or not the larvicide is first encapsulated by yeast cells, the nature of the larvicide otherwise used and the release rate of the larvicide from the capsule. The process setup to create the capsules has several key factors that impact the rate of release by manipulating the structure of the polymer network. These primarily include crosslinker concentration and size, polymer concentration, and crosslinking time. For the crosslinker, increased concentration and size will yield a smaller pore size and the slower the encapsulated larvicide will diffuse. In embodiments which utilize yeast cell encapsulated larvicide, if the pore size is smaller than the larvicide encapsulated in yeast cells, the larvicide will not diffuse. The concentration of the polymer follows similarly. The higher the concentration of the polymer, the less pore space there is for the larvicide to release. In embodiments, divalent ($Ba^{2+}$, $Sr^{2+}$, $Ca^{2+}$, or $Mg^{2+}$) and covalent (gelatin) crosslinkers ranging from 0.5-15% aqueous solutions are often used. The percent solution will be dependent upon the selected crosslinker due to differences in chemical structures, cation size and the ability of the covalent crosslinkers to bond.

Formation of Capsules

The polysaccharides used to form capsules pursuant to the present invention naturally exist in a liquid state. In order to create solid capsules out of these polysaccharides, crosslinking at some stage must occur. Crosslinking, described above, is the process of bonding polymer chains together through either covalent or ionic bonding. This crosslinking results in a porous structure that is conceptualized by what is known as the egg-box model, as seen in FIG. 4, below. In embodiments, these porous structures are gels. For example, polymers can be crosslinked to encapsulate the larvicide into the pores of the resulting structure.

FIG. 4 shows an egg-box structure as a result of polymer crosslinking.

Briefly, the larvicide (i.e.: essential oil or yeast-encapsulated essential oil) is coated with chitosan by spray drying. This method of encapsulation is conceptually similar to ionotropic gelation but is more readily scalable for manufacturing purposes and is commonly used in drug delivery applications. In an embodiment, the materials are combined and crosslinked via the spray dryer to yield dried microcapsules of larvicide encapsulated into polymer (e.g. chitosan, beta-glucan, alginate or a mixture thereof). The spray drying method and powder-like product may be more desirable for larger-scale manufacturing and applications. The polymer-covered (often chitosan) larvicide will then be thoroughly mixed into heated liquid polymer, often alginate, until the solution is homogenous. Capsules pursuant to the invention will be created by adding the larvicide-polymer (alginate) solution dropwise to a crosslinking solution (e.g. $CaCl_2$ or other crosslinking agent) and mixed for a predetermined amount of time (e.g. 5, 10, or 20 minutes) depending on the desired level of crosslinking. The capsules are then removed from the crosslinking solution and washed several times (e.g. 3× or more) with DI water and air dried for storage below ambient temperature (e.g. at 4° C.). This same or similar methods may be used to encapsulate larvicide into any of the polymers described herein, varying the concentration of polymer and the type and amount of crosslinker used to provide capsules pursuant to the present invention.

Increased exposure time of the polymer-larvicide mixture to the crosslinker allows for further crosslinking of the polymer resulting in smaller pores. Preliminary data (FIG. 5) explored the effect of crosslinking time (5, 20, and 30 minutes) for larvicide-laden alginate beads using 1% CaCl$_2$ as the crosslinking agent. The crosslinked alginate beads were placed in water and the release of larvicide cells from the bead was monitored for up to 30 days. The release of the larvicide from the beads was observed to be correlated with the crosslinking time. Specifically, the longer the bead was crosslinked, the slower the larvicide was released.

For purposes of the present application, Bti can be encapsulated by the polymers via ionotropic gelation or spray drying, methods well known in the art. For both applications, Bti is emulsified in water and then added to the polymer solution to prepare for the encapsulation process. It is otherwise treated as described above for the larvicide (i.e.: essential oil or yeast-encapsulated essential oil).

Figure 5:
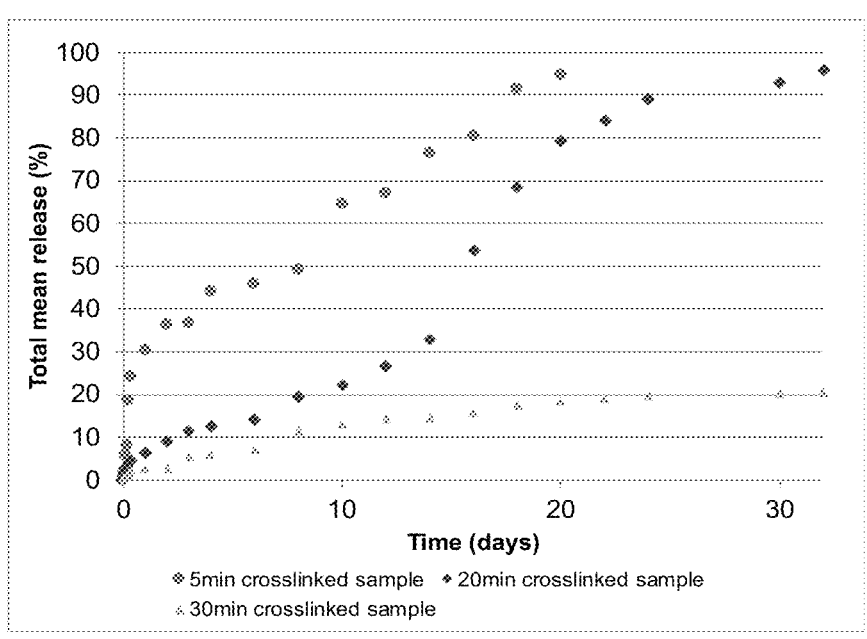
FIG. 5 shows the total percent cells released from the alginate bead into water for a period of up to 30 days. The alginate-larvicide mixture was crosslinked for 5, 20, and 30 minutes with 1% CaCl2 to form the larvicide-laden alginate beads.

FIG. 5 shows the total percent cells released from the alginate bead into water for a period of up to 30 days. The alginate-larvicide mixture was crosslinked for 5, 20, and 30 minutes with 1% CaCl$_2$ to form the larvicide-laden alginate beads.

In the case of using *Bacillus thuringiensis* (Bti) as larvicide,

Mechanisms of Release

Release of encapsulated materials from a crosslinked polymer capsule can be achieved in two principal ways: diffusion or polymer degradation. Crosslinked polymer-larvicides capsules will swell once submerged in water. If the polymer has a low degree of crosslinking and is highly porous, the pores will swell enough to allow water to flow into the capsule and diffuse the encapsulated larvicide out into the environment to be ingested by mosquito larvae. The outer chitosan layer on the exterior of the larvicide cells will protect the product from microbial degradation. Enzymes within the larval gut will digest the chitosan layer protecting the larvicide upon ingestion.

The following exemplary method provides yeast *S. cerevisiae* encapsulated larvicide. Modifications to this approach may be readily made by the skilled practitioner.

The essential oil, fresh baker's yeast (*S. cerevisiae*) and water are mixed in a weight ratio corresponding from 1:2:7 to 1:4.5:16, depending on the oil used, to provide Mixture 1. Mixture 1 is agitated in a rotary incubator at approximately 250 rpm at 40° C. for approximately 24 hrs (±1 hr).

Mixture 1 is then transferred to jars for centrifugation for 10 minutes at no more than 1700×g).

After decanting supernatant, consisting of excess oil, yeast and water, the cells are washed with ~200 mL water. 30-60 mL of a 10% TWEEN solution is added to the mixture (depending on oil being used), and the fill jar to 400 mL with DI water, and mixed vigorously. The jars are centrifuged again with same settings as above. The washing step with the 10% TWEEN may be repeated depending on the selected oil. For all oils, following the 10% TWEEN wash(es), the washing step is repeated 3 more times without addition on the 10% TWEEN to remove all excess oil and detergent. A final 50% (m/m) solution of wet yeast with H$_2$O is prepared if storing wet.

For lyophilization, an 80% (m/m) solution of wet yeast with H$_2$O is frozen for the freeze-drying process (48 hours).

The yeast-encapsulated larvicide is then subjected to further encapsulation using one or more polymers following the method as described above.

The invention claimed is:

1. An ingestible larvicide composition comprising:
   an effective amount of larvicide comprising *Bacillus thuringiensis israelensis* (Bti);
   the Bti disposed within a non-viable yeast cell;
   the non-viable yeast cell disposed within a crosslinked polymer comprising chitosan, strontium, and genipin;
   the crosslinked polymer further comprising alginic acid and beta-glucan;
   the chitosan at a molecular weight of 1 to 1000 kilodaltons (kDa); and
   the composition forming an egg-box structure.

2. The composition of claim 1, further comprising an additional larvicide that is an essential oil.

3. The composition of claim 2, wherein the essential oil comprises orange oil.

4. The composition of claim 2, wherein the essential oil comprises fennel oil.

5. The composition of claim 1, wherein the beta-glucan polymer comprises beta-1,3-glucan linkages.

6. The composition of claim 1, further comprising a crosslinker.

7. The composition of claim 6, wherein the crosslinker comprises polytriphosphate.

8. The composition of claim 6, wherein the crosslinker comprises gelatin.

9. The composition of claim 6, wherein the crosslinker comprises a divalent cation.

10. The composition of claim 9, wherein the divalent cation comprises calcium.

11. The composition of claim 9, wherein the divalent cation comprises barium.

12. The composition of claim 9, wherein the divalent cation comprises magnesium.

13. The composition of claim 1, wherein the chitosan is at least 75% deacetylated.

14. The composition of claim 1, wherein the crosslinked polymer comprises a polysaccharide.

15. The composition of claim 14, wherein the polysaccharide comprises beta-glucan from *Saccharomyces cerevisiae*.

16. The composition of claim 14, wherein the polysaccharide comprises alginate.

17. The composition of claim 1, wherein the alginic acid is methacrylated.

18. The composition of claim 1, wherein the crosslinked polymer forms a dried microcapsule.

19. The composition of claim 1, wherein the crosslinked polymer is crosslinked by a covalent bond.

20. The composition of claim 1, wherein the crosslinked polymer is crosslinked by an ionic bond.

* * * * *